US009514373B2

(12) United States Patent
Jeromin et al.

(10) Patent No.: US 9,514,373 B2
(45) Date of Patent: Dec. 6, 2016

(54) IMAGING SYSTEM AND METHOD FOR FOG DETECTION (71) Applicant: Gentex Corporation, Zeeland, MI (US)

(72) Inventors: Oliver M. Jeromin, Holland, MI (US); David M. Falb, Grand Rapids, MI (US); Jeremy A. Schut, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 168 days.

(21) Appl. No.: 14/469,899

(22) Filed: Aug. 27, 2014

(65) Prior Publication Data

US 2015/0061493 A1 Mar. 5, 2015

Related U.S. Application Data (60) Provisional application No. 61/871,004, filed on Aug. 28, 2013.

(51) Int. Cl.
*G06K 9/00* (2006.01)
*B60Q 1/20* (2006.01)
*B60Q 1/14* (2006.01)

(52) U.S. Cl.
CPC ........... *G06K 9/00825* (2013.01); *B60Q 1/143* (2013.01); *B60Q 1/20* (2013.01); *B60Q 2300/312* (2013.01)

(58) Field of Classification Search
CPC .. G06K 9/00; G06K 9/00805; G06K 9/00825; B60Q 1/143; B60Q 1/20; H04N 9/07
USPC ............................. 315/82; 382/103, 104, 181
See application file for complete search history.

(56) References Cited

U.S. PATENT DOCUMENTS

| 6,037,976 | A | 3/2000 | Wixson |
| 6,254,259 | B1 | 7/2001 | Kobayashi |
| 6,429,594 | B1 | 8/2002 | Stam et al. |
| 6,853,897 | B2 | 2/2005 | Stam et al. |
| 7,019,275 | B2 | 3/2006 | Stam et al. |

(Continued)

FOREIGN PATENT DOCUMENTS

| EP | 1498721 | 7/2003 | |
| FR | 2965354 A1 | * 3/2012 | ........... G01N 21/538 |
| JP | 2012167983 | 2/2011 | |
| WO | WO9923828 | 5/1999 | |

OTHER PUBLICATIONS

Patent Cooperation Treaty, International Searching Authority, International Search Report, Written Opinion of the International Searching Authority and Notification of Transmittal, Dec. 25, 2014, 6 pages.

(Continued)

*Primary Examiner* — Daniel D Chang
(74) *Attorney, Agent, or Firm* — Price Heneveld LLP; Bradley D. Johnson (57) ABSTRACT

An imaging system and method for fog detection are disclosed herein. An imager is configured to image a scene external and forward of a controlled vehicle and to generate image data corresponding to the acquired images. A controller is configured to receive and analyze the image data. When exterior lights of the controlled vehicle are operated in a low beam state, the controller is able to detect light sources of interest in the image data, determine if each light source of interest is a foggy light or a clear light, and generate a first signal if a fog entry condition is satisfied.

20 Claims, 6 Drawing Sheets

(56) References Cited

U.S. PATENT DOCUMENTS

| | | | |
|---|---|---|---|
| 7,208,723 B2 | 4/2007 | Takenaga et al. | |
| 7,423,752 B2 | 9/2008 | Leleve et al. | |
| 7,505,604 B2 | 3/2009 | Zakrzewski et al. | |
| 7,656,277 B2 | 2/2010 | Kawasaki | |
| 8,077,921 B2 | 12/2011 | Kawasaki | |
| 8,103,442 B2 | 1/2012 | Akita | |
| 8,254,635 B2 | 8/2012 | Stein et al. | |
| 2003/0107323 A1 | 6/2003 | Stam | |
| 2008/0169912 A1 | 7/2008 | Kawasaki | |
| 2010/0172542 A1* | 7/2010 | Stein | G06K 9/00798 382/103 |
| 2012/0200224 A1 | 8/2012 | Schofield | |
| 2013/0057687 A1 | 3/2013 | Ehlgen et al. | |
| 2014/0029790 A1* | 1/2014 | Gallen | G01N 21/538 382/103 |
| 2014/0247968 A1 | 9/2014 | Pavlic | |

OTHER PUBLICATIONS

Rebecca Boyle, Windshield-Mounted Optical Sensor Helps Cars See, Even When It's Foggy or Dark Outside, Fraunhofer IZM, http://www.popsci.com/cars/article/2011-07/new-windshield-optical-sensor-helps-cars-see-better-even-when-its-foggy-or-dark-outside, Jul. 6, 2011.

Hautiere, N., Tarel, JP, Aubert D., Fog-Free In-Vision Systems Through Contrast Restoration, Computer Vision and Pattern Recognition, http://ieeexplore.ieee.org/xpl/articleDetails.jsp?tp=&arnumber=4270284&queryText%3DTowards+Fog-Free+In-Vehicle+Vision+Systems+through+Contrast+Restoration, 2007.

Pharos Marine Automatic Power, FD-330 Visibility Sensor, May 23, 2013.

* cited by examiner

IMAGING SYSTEM AND METHOD FOR FOG DETECTION

CROSS-REFERENCE TO RELATED APPLICATIONS

This application claims priority to and the benefit under 35 U.S.C. §119(e) of U.S. Provisional Patent Application No. 61/871,004, filed on Aug. 28, 2013, entitled "SYSTEM AND METHOD FOR CONTROLLING EXTERIOR VEHICLE LIGHTS THAT IS RESPONSIVE TO FOG DETECTION," the entire disclosure of which is hereby incorporated herein by reference.

FIELD OF THE INVENTION

The present invention generally relates to an imaging system for vehicular use. The present invention provides an imaging system with improved features for fog detection.

SUMMARY OF THE INVENTION

According to one aspect of the present invention, an imaging system for fog detection is provided. The system includes an imager configured to image a scene external and forward of a controlled vehicle and to generate image data corresponding to the acquired images. A controller is configured to receive and analyze the image data. When exterior lights of the controlled vehicle are operated in a low beam state, the controller is able to detect light sources of interest in the image data, determine if each light source of interest is a foggy light or a clear light, and generate a first signal if a fog entry condition is satisfied.

According to another aspect of the present invention, a method of fog detection is provided. The method includes the steps of operating exterior lights of a controlled vehicle in a low beam state; imaging a scene external and forward of the controlled vehicle and generating image data corresponding to the acquired images; analyzing the image data to detect light sources of interest; determining if each light source of interest is a foggy light or a clear light; and generating a first signal if a fog entry condition is satisfied.

According to yet another aspect of the present invention, a non-transitory computer-readable medium is provided having stored thereon software instructions that, when executed by a processor, includes the steps of operating exterior lights of a controlled vehicle in a low beam state; imaging a scene external and forward of the controlled vehicle and generating image data corresponding to the acquired images; analyzing the image data to detect light sources of interest; determining if each light source of interest is a foggy light or a clear light; and generating a first signal if a fog entry condition is satisfied.

These and other features, advantages, and objects of the present invention will be further understood and appreciated by those skilled in the art by reference to the following specification, claims, and appended drawings.

BRIEF DESCRIPTION OF THE DRAWINGS

The present invention will be become more fully understood from the detailed description and the accompanying drawings, wherein.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figured are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components, A, B, and/or C, the composition can contain A alone; B alone; C alone; A and B in combination, A and C in combination; B and C in combination; or A, B, and C in combination.

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The embodiments described herein relate to an imaging system that may be used for controlling exterior lights of a controlled vehicle in response to image data acquired from an image sensor, which captures images forward of the vehicle. Auto High Beam (AHB) and alternate methods of controlling the light beam illumination in front of a motor vehicle maximizes the use of high beams at night by identifying oncoming and preceding vehicles and automatically controlling the high beam lighting pattern. This prevents glare to other vehicles, yet maintains a high beam light distribution to illuminate areas not occupied by other vehicles. Prior systems are known for controlling exterior vehicle lights in response to images captured forward of the vehicle. In these prior systems, a controller would analyze the captured images and determine if any preceding or oncoming vehicles were present in a glare area in front of the vehicle employing the system. This "glare area" was the area in which the exterior lights would cause excessive glare to a driver if the exterior lights were in a high beam state (or some state other than a low beam state). If a vehicle was present in the glare area, the controller would respond by changing the state of the exterior lights so as to not cause glare for the other driver(s). Examples of such systems are described in U.S. Pat. Nos. 5,837,994, 5,990,469, 6,008,486, 6,049,171, 6,130,421, 6,130,448, 6,166,698, 6,255,639, 6,379,013, 6,403,942, 6,587,573, 6,593,698, 6,611,610, 6,631,316, 6,653,614, 6,728,393, 6,774,988, 6,861,809, 6,906,467, 6,947,577, 7,321,112, 7,417,221, 7,565,006, 7,567,291, 7,653,215, 7,683,326, 7,881,839, 8,045,760, and 8,120,652, the entire disclosures of which are incorporated herein by reference.

In some of the prior systems using AHB or alternative methods of controlling the light beam illumination in front of a motor vehicle, the controller would analyze the captured images to detect whether the vehicle was in or entering a village (or town) that is sufficiently lighted. The controller would then typically either place the exterior lights in a low beam state or otherwise inhibit operation of high beam headlights. The high beams or alternate beam illumination are then reactivated when the village area is exited. Various methods are used including detecting streetlights or measuring the ambient brightness level when entering a village to determine whether to activate or re-activate the high beam headlights. Examples of such systems are described in U.S. Pat. Nos. 6,861,809, 7,565,006, and 8,045,760, and also in U.S. patent application Ser. No. 13/486,636 filed on Jun. 1, 2012, by Peter A. Liken et al., entitled "SYSTEM AND METHOD FOR CONTROLLING VEHICLE EQUIPMENT RESPONSIVE TO A MULTI-STAGE VILLAGE DETECTION," the entire disclosures of which are incorporated herein by reference.

When driving in a high beam state, the controller in some prior systems would analyze the captured images to detect an atmospheric condition, such as fog or other air particulates suspended in air. In foggy conditions, the presence of fog particles causes light emitted from a vehicle to be reflected back towards the vehicle, a phenomenon referred to herein as backscattering. When backscattering occurs, a driver's vision of the road may be impaired and the enabling of high beams may further exacerbate the situation. In response, some prior systems would detect the presence of backscatter. Upon determining that a foggy condition exists, the controller would typically place the exterior lights in a lower beam state and/or otherwise inhibit automatic control of the high beams. Additionally, in some systems, the controller would automatically adjust vehicle front and rear fog lights based on the detection of the foggy condition. Examples of such systems are described in U.S. Pat. Nos. 6,587,573 and 8,045,760, the entire disclosures of which are incorporated herein by reference.

Although the previously described systems are successful in detecting fog, they often rely upon the presence of backscatter, which is more easily detected when high beams are enabled. However, in certain instances, the use of high beams may be inhibited and/or undesirable. For example, if the system employs village detection, the use of high beams may be inhibited while a vehicle is travelling inside a village or other well-illuminated areas. Also, in high traffic areas, the use of high beams may be inhibited so as not to cause glare to oncoming drivers. Further, while it may be possible for a driver to manually enable the high beams, doing so may cause an unnecessary distraction to the driver of the vehicle as well as other people in the vicinity such as other drivers, pedestrians, etc. In light of the above, improvements are possible over such systems by using other indicators to enable a system to reliably detect fog without having to be in a high beam state. One such system and method is described below and allows for an AHB system, or alternate methods of controlling the light beam illumination in front of a motor vehicle, to detect fog in a low a beam state or some other beam state.

Figure 1:
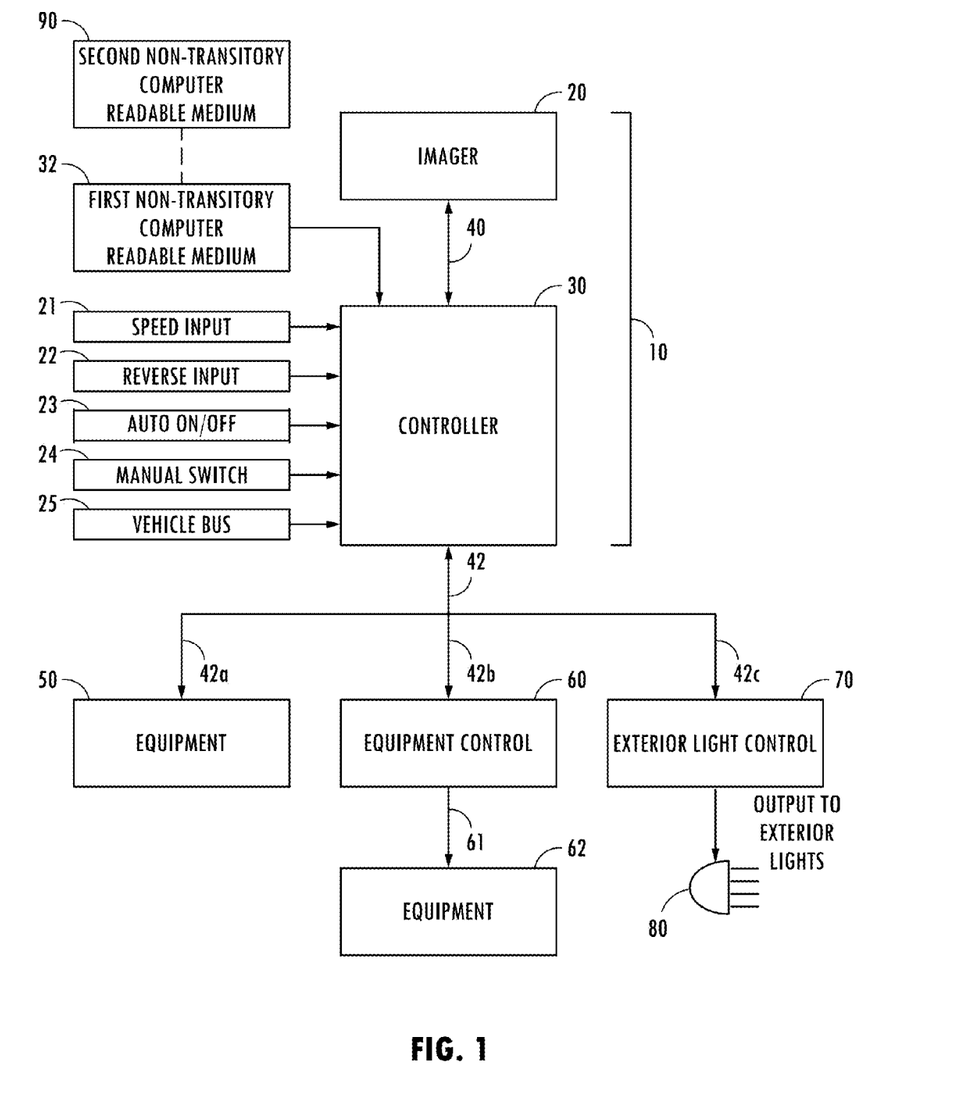
FIG. 1 is a block diagram of an imaging system constructed according to an embodiment of the present invention.

A first embodiment of an imaging system 10 is shown in FIG. 1. Imaging system 10 may be provided for controlling exterior lights 80 and, optionally, other equipment (50, 62) of a controlled vehicle. System 10 includes an imager 20 and a controller 30. Imager 20 includes an image sensor (201, FIG. 2) having a plurality of pixels and is configured to image a scene external and forward of the controlled vehicle and to generate image data corresponding to the acquired images. Controller 30 receives and analyzes the image data and generates a signal that may be used to control exterior lights 80 and may generate signals to control any additional equipment (50, 62). These signals are generated in response to analysis of the image data.

Controller 30 may be configured to directly connect to the equipment (50) being controlled such that the generated signals directly control the equipment. Alternatively, controller 30 may be configured to connect to an equipment control (60 and 70), which, in turn, is connected to the equipment being controlled (62 and 80) such that the signals generated by controller 30 only indirectly controls the equipment. For example, in the case of the equipment being exterior lights 80, controller 30 may analyze the image data from imager system 20 so as to generate signals that are more of a recommendation for an exterior light control 70 to use when controlling exterior lights 80. The signals may further include not just a recommendation, but also a code representing a reason for the recommendation so that equipment controls (60 and 70) may determine whether or not to override a recommendation. Further, as described in detail below, the signal may include an indication that fog has been detected. Such a fog indication signal is particularly useful when an equipment control (60 and 70) that is separate from controller 30 performs the direct control of the equipment (62 and 80).

As shown in FIG. 1, various inputs (such as inputs 21-24) may be provided to controller 30 that may be taken into account in forming a recommendation or direct control signal. In some cases, such inputs may instead be provided to equipment control (60 and 70). For example, input from manual switches may be provided to equipment control (60 and 70), which may allow equipment control (60 and 70) to override a recommendation from controller 30. It will be appreciated that various levels of interaction and cooperation between controller 30 and equipment controls (60 and 70) may exist. One reason for separating control functions is to allow imager 20 to be located in the best location in the vehicle for obtaining images, which may be a distance from the equipment to be controlled and to allow communication over the vehicle bus 25.

According to one embodiment, the equipment that imaging system 10 can control may include one or more exterior lights 80 and the signal generated by controller 30 may be an exterior light control signal. In this embodiment, exterior lights 80 may be controlled directly by controller 30 or by an exterior light control 70, which receives a signal from controller 30. As used herein, the "exterior lights" broadly includes any exterior lighting on the vehicle. Such exterior lights may include headlights (both low and high beam if separate from one another), taillights, foul weather lights such as fog lights, brake lights, center-mounted stop lights (CHMSLs), turn signals, back-up lights, etc. The exterior lights may be operated in several different modes including conventional low beam and high beam states. They may also be operated as daytime running lights, and additionally as super-bright high beams in those countries where they are permitted.

The exterior light brightness may also be continuously varied between the low, high, and super-high states. Separate lights may be provided for obtaining each of these exterior lighting states or the actual brightness of the exterior lights may be varied to provide these different exterior lighting states. In either case, the "perceived brightness" or illumination pattern of the exterior lights is varied. As used herein, the term "perceived brightness" means the brightness of the exterior lights as perceived by an observer outside the vehicle. Most typically, such observers will be drivers or passengers in a preceding vehicle or in a vehicle traveling along the same street in the opposite direction. Ideally, the exterior lights are controlled such that if an observer is located in a vehicle within a "glare area" relative to the vehicle (i.e., the area in which the observer would perceive the brightness of the exterior lights as causing excessive glare), the beam illumination pattern is varied such that the observer is no longer in the glare area. The perceived brightness and/or glare area of the exterior lights may be varied by changing the illumination output of one or more exterior lights, by steering one or more lights to change the aim of one or more of the exterior lights, selectively blocking or otherwise activating or deactivating some or all of the exterior lights, altering the illumination pattern forward of the vehicle, or a combination of the above.

Imager 20 may be any conventional imager. Examples of suitable imagers are disclosed in published United States Patent Application Publication Nos. 20120072080 A1 and U.S. Pat. No. 8,289,430, and in U.S. Provisional Application Nos. 61/500,418 entitled "MEDIAN FILTER" filed on Jun. 23, 2011, by Jon H. Bechtel et al.; 61/544,315 entitled "MEDIAN FILTER" and filed on Oct. 7, 2011, by Jon H. Bechtel et al.; 61/556,864 entitled "HIGH DYNAMIC RANGE CAMERA LOW LIGHT LEVEL FILTERING" filed on Nov. 8, 2011, by Jon H. Bechtel et al., the entire disclosures of which are incorporated herein by reference.

The imager 20 system includes an image sensor (201, FIG. 2) (or camera) to capture images that may then be displayed and/or analyzed in order to control vehicle equipment in addition to exterior lights. For example, such imagers have been used for lane departure warning systems, forward collision warning systems, adaptive cruise control systems, pedestrian detection systems, night vision systems, terrain detection systems, parking assist systems, traffic sign recognition systems, and reverse camera display systems. Examples of systems using imagers for such purposes are disclosed in U.S. Pat. Nos. 5,837,994, 5,990,469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, and 8,120,652, and in U.S. Provisional Application Nos. 61/512,213 entitled "RAISED LANE MARKER DETECTION SYSTEM AND METHOD THEREOF" and filed on Jul. 27, 2011, by Brock R. Rycenga et al., and 61/512,158 entitled "COLLISION WARNING SYSTEM AND METHOD THEREOF" and filed on Jul. 27, 2011, by Brock R. Rycenga et al., the entire disclosures of which are incorporated herein by reference.

In the example shown in FIG. 1, imager 20 may be controlled by controller 30. Communication of imager parameters as well as image data occurs over communication bus 40, which may be a bi-directional serial bus, parallel bus, a combination of both, or other suitable means. Controller 30 serves to perform equipment control functions by analyzing images from imager 20, determining an equipment (or exterior light) state based upon information detected within those images, and communicating the determined equipment (or exterior light) state to the equipment 50, equipment control 60, or exterior light control 70 through bus 42, which may be the vehicle bus 25, a CAN bus, a LIN bus or any other suitable communication link.

Controller 30 may control the imager 20 to be activated in several different modes with different exposure times and different readout windows. Controller 30 may be used to both perform the equipment or exterior light control function and control the parameters of imaging imager 20.

Controller 30 can also take advantage of the availability of signals (such as vehicle speed, steering wheel angle, pitch, roll, and yaw) communicated via discreet connections or over the vehicle bus 25 in making decisions regarding the operation of the exterior lights 80. In particular, speed input 21 provides vehicle speed information to the controller 30 from which speed can be a factor in determining the control state for the exterior lights 80 or other equipment. The reverse signal 22 informs controller 30 that the vehicle is in reverse, responsive to which the controller 30 may clear an electrochromic mirror element regardless of signals output from light sensors. Auto ON/OFF switch input 23 is connected to a switch having two states to dictate to controller 30 whether the vehicle exterior lights 80 should be automatically or manually controlled. The auto ON/OFF switch (not shown) connected to the ON/OFF switch input 23 may be incorporated with the headlight switches that are traditionally mounted on the vehicle dashboard or incorporated into steering wheel column levels. Manual dimmer switch input 24 is connected to a manually actuated switch (not shown) to provide a manual override signal for an exterior light control state. Some or all of the inputs 21, 22, 23, 24 and outputs 42a, 42b, and 42c, as well as any other possible inputs or outputs, such as a steering wheel input, can optionally be provided through vehicle bus 25 shown in FIG. 1. Alternatively, these inputs 21-24 may be provided to equipment control 60 or exterior light control 70.

Controller 30 can control, at least in part, other equipment 50 within the vehicle which is connected to controller 30 via vehicle bus 42. Specifically, the following are some examples of one or more equipment 50 that may be controlled by controller 30: exterior lights 80, a rain sensor, a compass, information displays, windshield wipers, a heater, a defroster, a defogger, an air conditioning system, a telephone system, a navigation system, a security system, a tire pressure monitoring system, a garage door opening transmitter, a remote keyless entry system, a telematics system, a voice recognition system such as a digital signal processor based voice actuation system, a vehicle speed control, interior lights, rearview mirrors, an audio system, an engine control system, and various other switches and other display devices that may be located throughout the vehicle.

In addition, controller 30 may be, at least in part, located within a rearview assembly of a vehicle or located elsewhere within the vehicle. The controller 30 may also use a second controller (or controllers), equipment control 60, which may be located in a rearview assembly or elsewhere in the vehicle in order to control certain kinds of equipment 62. Equipment control 60 can be connected to receive via vehicle bus 42 signals generated by controller 30. Equipment control 60 subsequently communicates and controls equipment 62 via bus 61. For example, equipment control 60 may be a windshield wiper control unit which controls windshield wiper equipment, turning this equipment ON or OFF. Equipment control may also be an electrochromic mirror control unit where controller 30 is programmed to communicate with the electrochromic control unit in order for the electrochromic control unit to change the reflectivity of the electrochromic mirror(s) in response to information obtained from an ambient light sensor, a glare sensor, as well as any other components coupled to the processor. Specifically, equipment control unit 60 in communication with controller 30 may control the following equipment: exterior lights, a rain sensor, a compass, information displays, windshield wipers, a heater, a defroster, a defogger, air conditioning, a telephone system, a navigation system, a security system, a tire pressure monitoring system, a garage door opening transmitter, a remote keyless entry, a telemetry system, a voice recognition system such as a digital signal processor-based voice actuation systems, a vehicle speed, interior lights, rearview mirrors, an audio system, a climate control, an engine control, and various other switches and other display devices that may be located throughout the vehicle.

Figure 2:
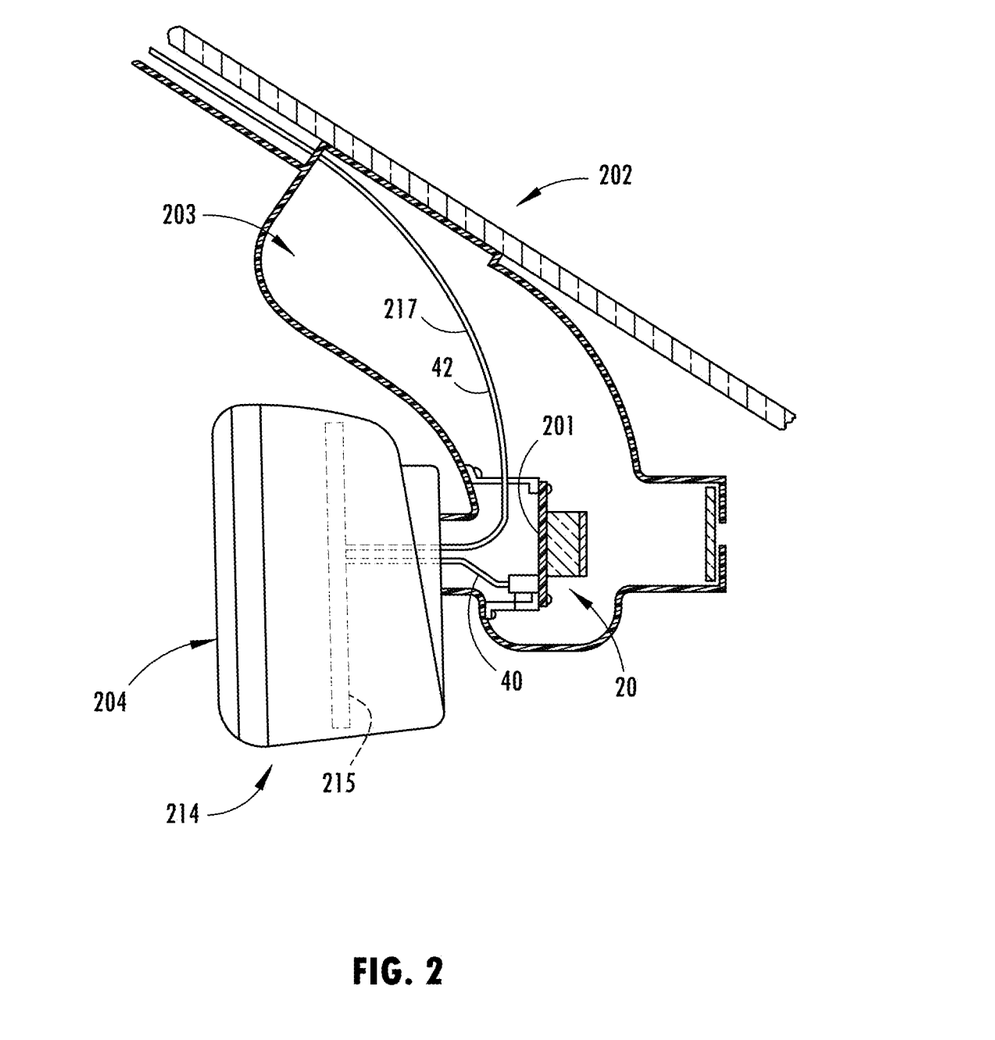
FIG. 2 is a partial cross section of a rearview mirror assembly incorporating an imaging system according to another embodiment of the present invention.

Portions of imaging system 10 can be advantageously integrated into a rearview assembly 200 as illustrated in FIG. 2, wherein imager 20 is integrated into a mount 203 of rearview assembly 200. This location provides an unobstructed forward view through a region of the windshield 202 of the vehicle that is typically cleaned by the vehicle's windshield wipers (not shown). Additionally, mounting the image sensor 201 of imager 20 in the rearview assembly 200 permits sharing of circuitry such as the power supply, microcontroller and light sensors.

Referring to FIG. 2, image sensor 201 is mounted within rearview mount 203, which is mounted to vehicle windshield 202. The rearview mount 203 provides an opaque enclosure for the image sensor with the exception of an aperture through which light is received from a forward external scene.

Controller 30 of FIG. 1 may be provided on a main circuit board 215 and mounted in rearview housing 204 as shown in FIG. 2. As discussed above, controller 30 may be connected to imager 20 by a bus 40 or other means. The main circuit board 215 may be mounted within rearview housing 204 by conventional means. Power and a communication link 42 with the vehicle electrical system, including the exterior lights 80 (FIG. 1), are provided via a vehicle wiring harness 217 (FIG. 2).

Rearview assembly 200 may include a mirror element or a display that displays a rearward view. The mirror element may be a prismatic element or an electro-optic element, such as an electrochromic element.

Additional details of the manner by which system 10 may be integrated into a rearview mirror assembly 200 are described in U.S. Pat. No. 6,611,610, the entire disclosure of which is incorporated herein by reference. Alternative rearview mirror assembly constructions used to implement imaging systems are disclosed in U.S. Pat. No. 6,587,573, the entire disclosure of which is incorporated herein by reference.

As previously mentioned, the current system 10 advantageously provides a means to detect a foggy condition without having to be in a high beam state. To do so, the controller 30 analyzes the image data to detect one or more light sources of interest therein. The light source of interest may include oncoming vehicle headlights, taillights, and/or streetlights as such light sources behave in predictable manners when exposed to a foggy condition.

Figure 3:
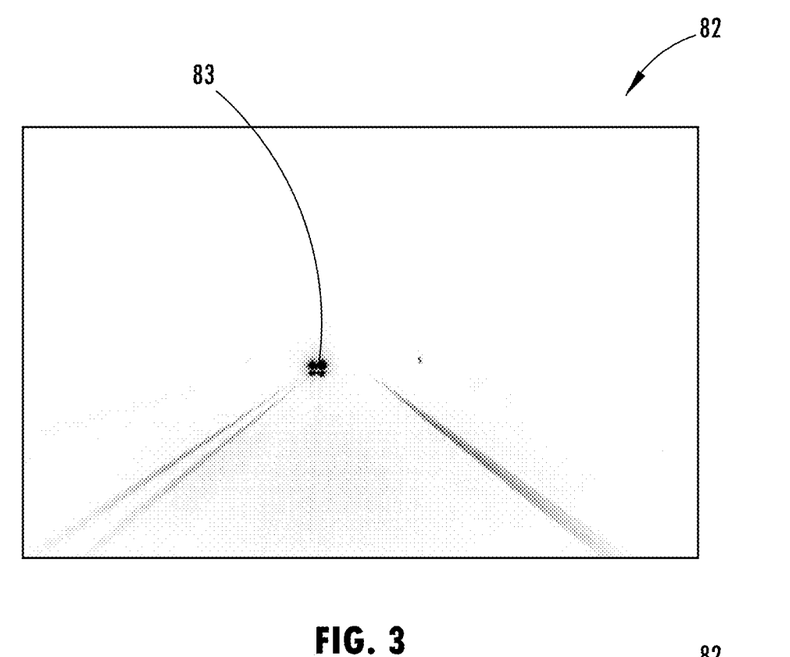
FIG. 3 is a pictorial representation of an imaged scene showing an oncoming vehicle headlight at a first distance during clear conditions.
Figure 4:
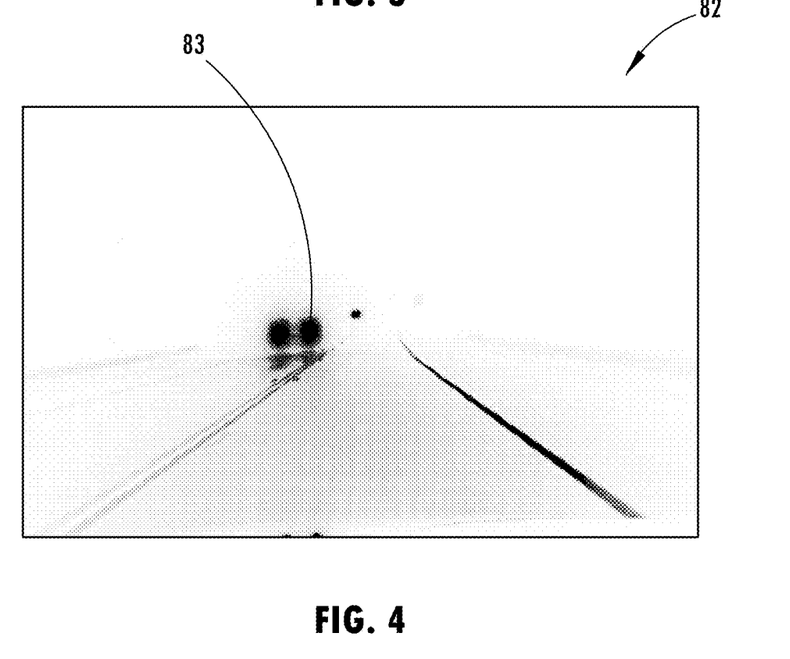
FIG. 4 is another pictorial representation of an imaged scene showing an oncoming vehicle headlight at a second distance during clear conditions.
Figure 5:
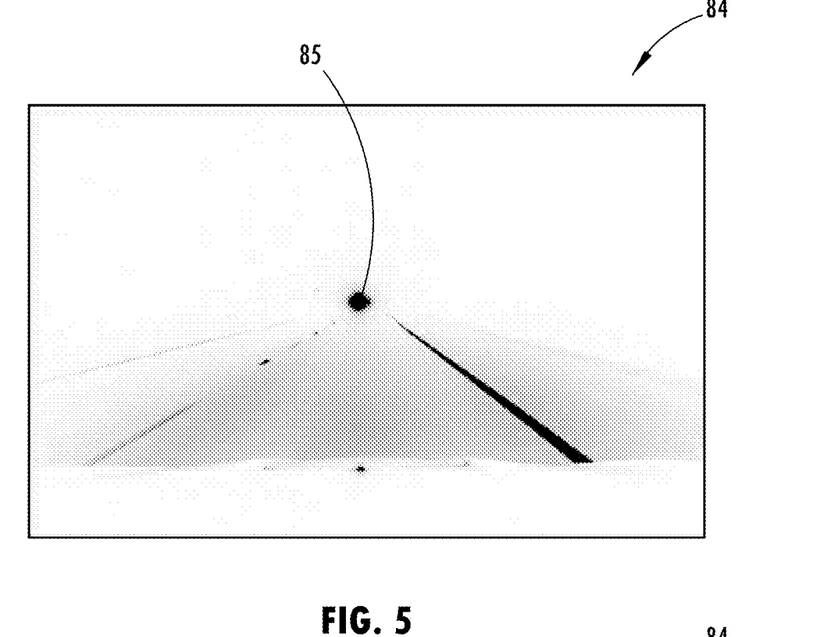
FIG. 5 is yet another pictorial representation of an imaged scene showing an oncoming vehicle headlight at approximately the first distance during foggy conditions.
Figure 6:
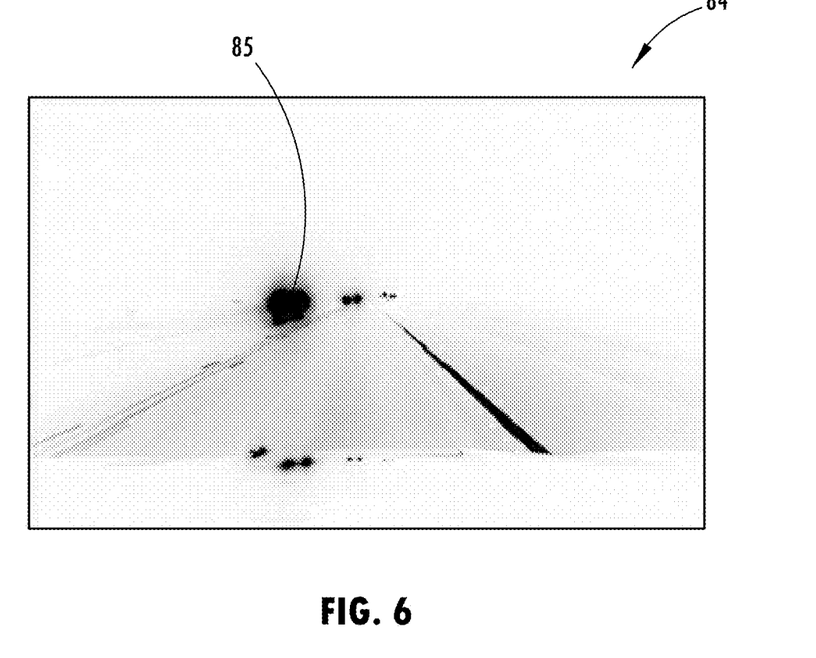
FIG. 6 is yet another pictorial representation of an imaged scene showing an oncoming vehicle heading at approximately the second distance during foggy conditions.

For purposes of illustration, FIGS. 3 and 4 are pictorial representations of an imaged scene 82 depicting oncoming vehicle headlights 83 at two different distances during clear conditions. In contrast, FIGS. 5 and 6 are pictorial representations of an imaged scene 84 depicting oncoming vehicle headlights 85 at distances substantially similar to those shown in FIGS. 3 and 4, respectively, with the exception that the conditions are foggy instead of clear. Under foggy conditions, light outputted from oncoming vehicle headlights 85 is typically scattered by fog particles present in the air. This results in oncoming vehicle headlights 85 exhibiting a light halo that is relatively larger than the light halo exhibited by oncoming vehicle headlights 83 operating under clear conditions. Similarly, other air particulates, such as snow, rain, smog, and dust, may also function to scatter oncoming light from light sources of interest, resulting in a larger light halo. While not shown in FIGS. 3-6, streetlights and taillights also tend to exhibit light halos that become visibly larger when conditions are foggy. With such distinctions in mind, the controller 30 of the current system 30 may apply one or more light metrics to determine if a light source of interest is a foggy light or a clear light. One light metric will now be described below in reference to FIG. 7.

Figure 7:
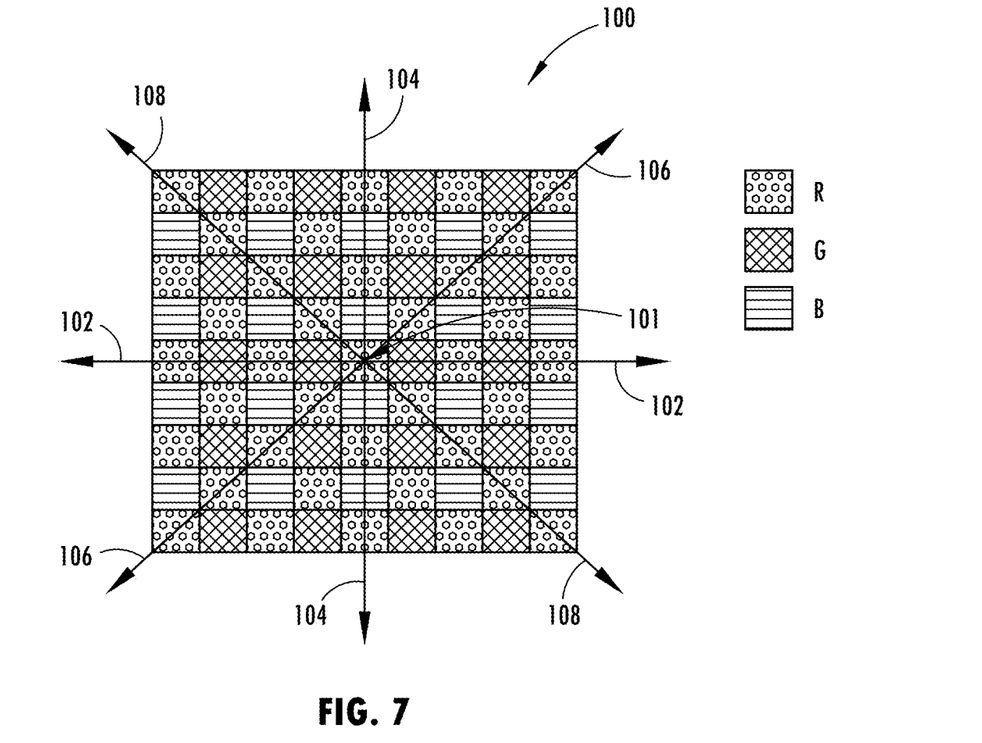
FIG. 7 is a pictorial representation of a color filter used to implement a light metric.

In FIG. 7, a color filter 100 is generally shown and can be coupled to the image sensor 201 to capture color information. The color filter 100 is exemplarily shown as an RGB color filter array having a plurality of two-by-two sub-arrays, each characterized as having two red (R) filters, one green (G) filter, and one blue (B) filter. It should be appreciated that other color filters may be used, having clear and/or infrared filters, in addition, or alternatively to any of the filters described above. Generally, longer wavelength light (e.g. red light) is better able to propagate through fog as compared to shorter wavelength light (e.g. blue). As such, the inclusion of a greater number of red filters may be beneficial in determining whether a light source is one of interest, and if so, whether the light source of interest is a foggy light or a clear light. As previously mentioned, a foggy light source typically exhibits a larger light halo relative to a clear light. Thus, at similar distances, light emitted from a foggy light is more spread out and is therefore likely to strike a larger number of red filters than light emitted from a clear light. This may result in a larger number of pixels (referred to herein as red pixels) of the image sensor 201 detecting wavelengths associated with red light. Moreover, the average measured light intensity per red pixel is likely to be less when the image sensor 201 images a foggy light as compared to a clear light. Image data from the imager 20 can be supplied to the controller 30 and the controller 30 can determine whether the light source of interest is a foggy light or a clear light based on the number of pixels detecting red light and/or the measured light intensity at each pixel. Moreover, the controller 30 can determine if a light source is one of interest by analyzing the image data to determine a shape of the light. For instance, an oncoming headlight operating in either foggy or clear conditions typically exhibits a light halo having circular properties. In such a case, for a given light source centered at pixel 101, the shape of the light may be determined by locating the outermost red pixel along eight directions defined by a horizontal bidirectional arrow 102, a vertical bidirectional arrow 104, and diagonal bidirectional arrows 106 and 108, respectively. Based on the relative positions of the outermost red pixels, the controller 30 may determine that light sources having circular properties are light sources of interest whereas those having non-circular properties are not light sources of interest. Furthermore, based on one or more characteristics of a foggy light, the controller 30 may estimate the density of the fog and/or a visibility range. In one implementation, the controller 30 may estimate the density of fog by monitoring changes to a light halo over a distance and/or time. Such changes may include, but are not limited to, changes to the size, shape, and intensity of the light halo. It should be appreciated that the abovementioned techniques may also be employed to detect the presence of other air particulates, such as snow, rain, smog, and dust, by virtue of their similar interactions with the light halo of a light source of interest.

Given the predictable characteristics of headlights, taillights, and streetlights appearing in foggy and clear conditions, the controller 30 may continuously analyze image data to detect these types of light sources, and subsequently determine if the light source of interest is a foggy light or a clear light. Based on a relationship between the number of detected foggy lights and clear lights, the controller 30 may determine whether or not a foggy condition exists and cause the exterior lights of the controlled vehicle to respond accordingly.

A method for fog detection will now be described herein with reference to FIG. 8. This method is described below as being implemented by controller 30 using image data received from imager 20. This method may be a subroutine executed by any processor, and thus this method may be embodied in a non-transitory computer readable medium having stored thereon software instructions that, when executed by a processor, cause the processor to control the equipment of the controlled vehicle, by executing the steps of the method described below. In other words, aspects of the inventive method may be achieved by software stored on a non-transitory computer readable medium or software modifications or updates to existing software residing in a non-transitory computer readable medium. Such software or software updates may be downloaded into a first non-transitory computer readable media 32 of controller 30 (or locally associated with controller 30 or some other processor) typically prior to being installed in a vehicle, from a second non-transitory computer readable media 90 located remote from first non-transitory computer readable media 32 (FIG. 1). Second non-transitory computer readable media 90 may be in communication with the first non-transitory computer readable media 32 by any suitable means, which may at least partially include the Internet or a local or wide area wired or wireless network.

Figure 8:
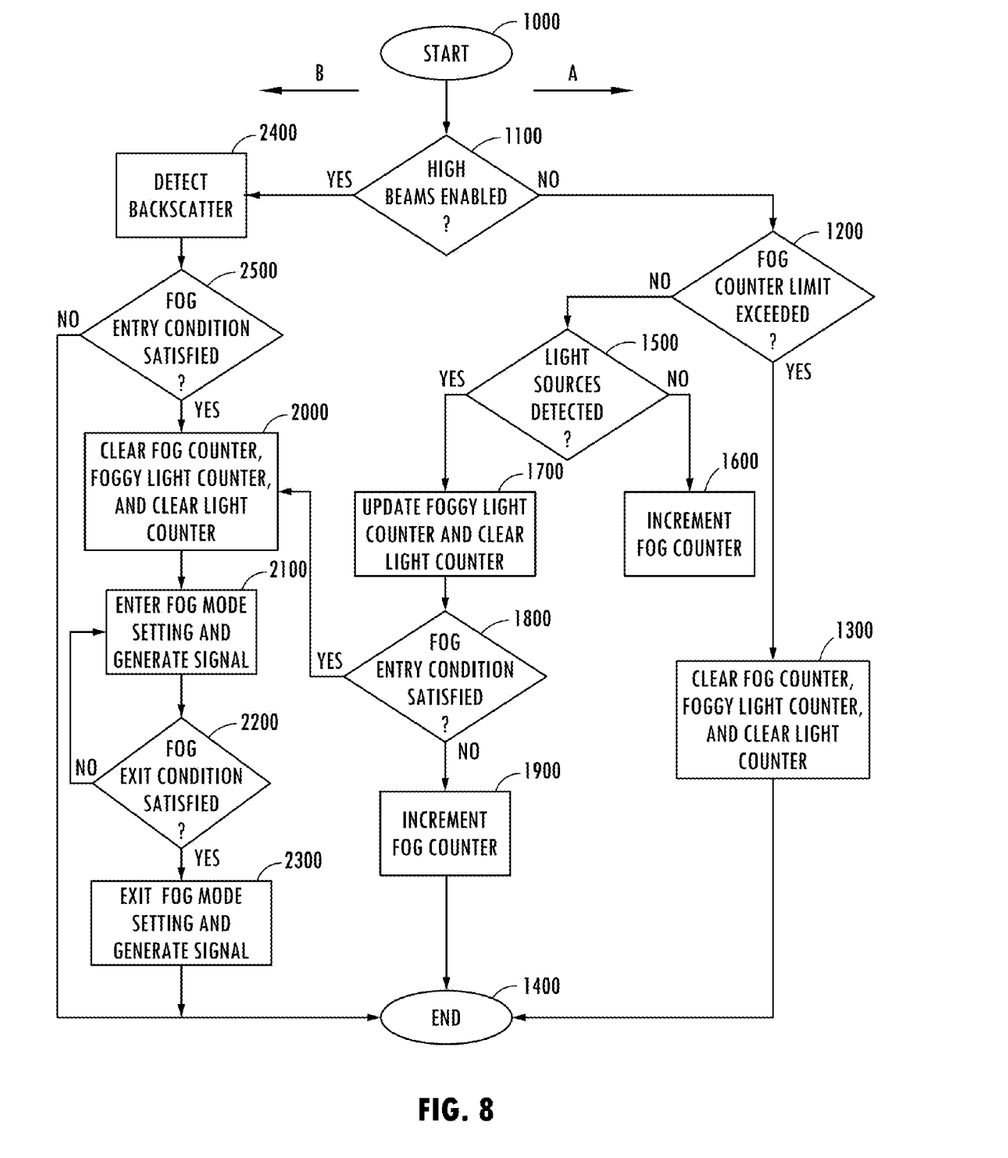
FIG. 8 is a flow chart illustrating a method for fog detection.

FIG. 8 shows a general flow chart illustrating various steps to be executed by the controller 30. Beginning with step 1000, the controller 30 initiates a first pass-through of the method. The method may be initiated by turning ON the system 10 and detecting that it is ready to receive and analyze image data, which may occur when the vehicle ignition is turned ON. In step 1100, the controller 30 monitors if the system 10 is in a high beam state. If the controlled vehicle is not operating under a high beam state, the method follows a low beam path shown by arrow A. On the other hand, if the vehicle is operating under a high beam state, the method follows a high beam path shown by arrow B.

For a better understanding of the method disclosed herein, the low beam path will first be described. The low beam path begins at step 1200, where the controller 30 determines if a fog counter limit has been exceeded. The fog counter serves to track the number of frames where no lights are detected and is typically cleared by default during the first pass-through. In this manner, the fog counter ensures that a determination of a foggy condition must be made within the specified number of acquired image frames by preventing foggy and clear light counter values from being stored indefinitely and used at a much later time to generate unreliable fog recommendations. Thus, if the fog counter limit has been exceeded in step 1200, the controller advances to step 1300 and clears the fog counter and also clears any values stored in a foggy light counter and a clear light counter. The controller 30 then advances to step 1400 to end the current pass-through and returns to step 1000 to begin another pass-through.

If the fog counter has not been exceeded in step 1200, the controller 30 advances to step 1500 to check if the system 10 has detected any light sources. If no light sources have been detected in step 1500, the controller 30 advances to step 1600, where it increments the fog counter and then proceeds to step 1400 to end the current pass-through and returns to step 1000 to begin another pass-through. If light sources have been detected in step 1500, the controller 30 identifies the number of foggy lights and clear lights from the detected light sources of interest and stores each value into the corresponding foggy light and clear light counters in step 1700.

The controller 30 then advances to step 1800 to determine if one or more fog entry conditions are satisfied. Satisfying the fog entry condition(s) can be based on a relationship between the number of foggy lights and the number of clear lights. For instance, one fog entry condition may require a ratio between the value stored in the foggy light counter (i.e. the number of foggy lights) and the value stored in the clear light counter (i.e. the number of clear lights) to be greater than a specified ratio threshold. Another fog entry condition may require a difference between the value stored in the foggy light counter and the value stored in the clear light counter to be greater than a specified difference threshold.

The method described herein may require either or both of the above described fog entry conditions to be satisfied in step 1800. Additionally or alternatively, fog entry condition(s) can be satisfied by implementing other approaches based on a relationship between the number of foggy lights and the number of clear lights. If using a ratio and/or a difference threshold, it may be desirable to limit the total number of clear lights that may be stored in the clear light counter to ensure that a foggy condition may be detected before the fog counter limit is reached, especially if the specified ratio and/or difference thresholds are particularly large. For example, if the vehicle is travelling on a busy village road during clear conditions, the controller 30 may detect such a large number of clear lights, which if stored, may prevent a fog entry condition from being satisfied within the specified number of image frames, if shortly thereafter, the vehicle exits the village onto a less busy road during foggy conditions. In such an instance, the controller 30 may be unable to detect a sufficient amount of foggy lights before the fog counter is cleared despite the presence of a foggy condition.

In any event, if the fog entry condition(s) are not satisfied in step 1800, the controller 30 advances to step 1900 and increments the fog counter. The controller 30 then advances to step 1400 to end the current pass-through before returning to step 1000 to begin another pass-through. Conversely, if the fog entry condition(s) are satisfied in step 1800, the controller 30 advances to step 2000 and clears the fog counter, the foggy light counter, and the clear light counter. The system 10 enters a fog mode setting in step 2100 and the controller 30 generates a signal used to directly or indirectly place the exterior lights of the controlled vehicle in a lower beam state and/or otherwise inhibit automatic high beam control of the exterior lights. While in the fog mode setting and/or prior to, the controller 30 may estimate a visibility range and/or the density of fog based on one or more characteristics of the detected foggy light(s), as described previously. Based on that estimation, various lighting functions may be initiated. For instance, a signal may be generated to recommend that the front and rear fog lamps be turned on. Additionally or alternatively, the signal may recommend brightening the taillights of the vehicle.

While in the fog mode setting, the controller 30 continuously monitors whether one or more fog exit conditions are satisfied in step 2200. According to one implementation, the controller 30 sets a fog exit timer to expire after a specified amount of time. During that time, if the controller 30 detects a foggy light, the fog exit timer may be either reset or incremented since the detection of the foggy light suggests the presence of an ongoing foggy condition. Additionally or alternatively, the fog exit timer may be decremented whenever the controller 30 detects a clear light. Thus, the speed in which the fog exit timer expires can be made to depend on the number of detected foggy lights and/or clear lights. Expiration of the fog exit timer can satisfy the fog exit condition. As a result, the controller 30 exits the fog mode setting and generates a signal in step 2300 that may be used to directly or indirectly re-enable automatic high beam control of the exterior lights of the controlled vehicle. One benefit of using a fog exit timer is that it ensures that the system 10 will not remain in the fog mode setting for an indefinite amount of time if a minimal amount or no light sources of interest are detected. However, it should be appreciated that other approaches may be used to satisfy the fog exit condition(s) of step 2200. Upon exiting the fog mode setting, the controller 30 advances to step 1400 to end the current pass-through before returning to step 1000 to begin another pass-through.

This completes the discussion of the low beam path and discussion will now turn to the high beam path. With respect to the illustrated embodiment, it should be noted that an un-cleared fog counter associated with step 1200 might still contain a count value even though the high beam path is active. Also, any count values present in the foggy and clear light counters may remain stored until the fog counter limit is exceeded despite the high beam path being active. This ensures that the low beam path is not unnecessarily impacted in instances when the high beams are enabled for only a brief moment and a foggy condition has not been detected. However, if the high beams are enabled for a sustained period of time, the fog counter and foggy light/clear light counters may be automatically cleared after a specified amount of time elapses to prevent values from being stored indefinitely due to the fog counter being inactive during extended cycling of the high beam path.

Moving on, the high beam path begins in step 2400, where the controller 30 analyzes image data and detects for the presence of backscatter. In step 2500, the controller 30 determines whether the detected amount of backscatter is sufficient to satisfy a fog entry condition and may estimate a visibility range based on the amount of backscatter detected. To determine if the fog entry condition is satisfied, the controller 30 can check whether the detected amount of backscatter exceeds a specified backscatter threshold. Additionally or alternatively, the controller 30 may determine if the fog entry condition is satisfied based on a number of foggy lights and clear lights, as described previously in the low beam path. If the fog entry condition is not satisfied, the controller 30 advances to step 1400 to signal the end of the pass-through before returning to step 1000 to initiate another pass-through. Otherwise, upon satisfying the fog entry condition in step 2500, the controller 30 performs in order steps 2000, 2100, 2200, and 2300 in the same manner as previously described in the discussion relating to the low beam path.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. An imaging system for fog detection, comprising:
   an imager configured to image a scene external and forward of a controlled vehicle and to generate image data corresponding to the acquired images; and
   a controller for analyzing the image data and configured to:
   detect light sources of interest in the image data;
   determine if each light source of interest is a foggy light or a clear light;
   count a number of foggy lights and clear lights; and
   generate a first signal if a fog entry condition is satisfied, wherein satisfaction of the fog entry condition is based on a relationship between the number of foggy lights and the number of clear lights.

2. The imaging system of claim 1, wherein each light source of interest comprises one of a headlight, a taillight, and a streetlight, and wherein the controller is further configured to estimate a fog density based on one or more characteristics of at least one foggy light.

3. The imaging system of claim 1, wherein the imager comprises an image sensor with a plurality of pixels coupled to a colored filter for filtering red light received from each light source of interest, and wherein the controller determines whether each light source of interest is a foggy light or a clear light based on at least one of a number of pixels detecting red light and a measured red light intensity at each pixel.

4. The imaging system of claim 1, wherein the controller is further configured to generate a second signal if a fog exit condition is satisfied.

5. The imaging system of claim 4, wherein satisfaction of the fog exit condition is based on an expiration of a fog exit timer.

6. The imaging system of claim 4, wherein the first signal is used to at least one of place exterior lights of the controlled vehicle in a lower beam state and inhibit automatic high beam control of the exterior lights, and wherein the second signal is used to re-enable automatic high beam control of the exterior lights.

7. The imaging system of claim 1, wherein based on exterior lights of the controlled vehicle operating in a high beam state, the controller is further configured to detect backscatter to determine whether the fog entry condition is satisfied.

8. The imaging system of claim 1, wherein the fog entry condition is satisfied if at least one of a ratio and a difference between the number of foggy lights and the number of clear lights is greater than a threshold value.

9. A method of fog detection, comprising the steps of:
  imaging a scene external and forward of the controlled vehicle and generating image data corresponding to the acquired images;
  analyzing the image data to detect light sources of interest;
  determining if each light source of interest is a foggy light or a clear light;
  counting a number of foggy lights and clear lights; and
  generating a first signal if a fog entry condition is satisfied, wherein satisfaction of the fog entry condition is based on a relationship between the number of foggy lights and the number of clear lights.

10. The method of claim 9, wherein the step of determining comprises filtering red light received from each light source of interest and sensing at least one of a light spread and an intensity associated with the red light.

11. The method of claim 9, further comprising the step of generating a second signal if a fog exit condition is satisfied, wherein the first signal is used to at least one of place exterior lights of the controlled vehicle in a lower beam state and inhibit automatic high beam control of the exterior lights, and wherein the second signal is used to re-enable automatic high beam control of the exterior lights.

12. The method of claim 9, further comprising the step of operating the exterior lights of the controlled vehicle in a high beam state and detecting backscatter to determine whether the fog entry condition is satisfied.

13. The method of claim 9, wherein each light source of interest comprises one of a headlight, a taillight, and a streetlight, and wherein the steps further comprise estimating a fog density based on one or more characteristics of at least one foggy light.

14. The method of claim 9, wherein the fog entry condition is satisfied if at least one of a ratio and a difference between the number of foggy lights and the number of clear lights is greater than a threshold value.

15. A non-transitory computer-readable medium having stored thereon software instructions that, when executed by a processor, comprise the steps of:
  imaging a scene external and forward of the controlled vehicle and generating image data corresponding to the acquired images;
  analyzing the image data to detect light sources of interest;
  determining if each light source of interest is a foggy light or a clear light;
  counting a number of foggy lights and clear lights; and
  generating a first signal if a fog entry condition is satisfied, wherein satisfaction of the fog entry condition is based on a relationship between the number of foggy light and the number of clear lights.

16. The non-transitory computer-readable medium of claim 15, wherein the step of determining comprises filtering red light received from each light source of interest and sensing at least one of a light spread and an intensity associated with the red light.

17. The non-transitory computer-readable medium of claim 15, wherein the steps further comprise generating a second signal if a fog exit condition is satisfied, wherein the first signal is used to at least one of place exterior lights of the controlled vehicle in a lower beam state and inhibit automatic high beam control of the exterior lights, and wherein the second signal is used to re-enable automatic high beam control of the exterior lights.

18. The non-transitory computer-readable medium of claim 15, wherein the steps further comprise operating exterior lights of the controlled vehicle in a high beam state and detecting backscatter to determine whether the fog entry condition is satisfied.

19. The non-transitory computer-readable medium of claim 15, wherein each light source of interest comprises one of a headlight, a taillight, and a streetlight, and wherein the steps further comprise estimating a fog density based on one or more characteristics of at least one foggy light.

20. The non-transitory computer-readable medium of claim 15, wherein the fog entry condition is satisfied if at least one of a ratio and a difference between the number of foggy lights and the number of clear lights is greater than a threshold value.

* * * * *